US010688881B2

(12) United States Patent
Tarnowsky et al.

(10) Patent No.: US 10,688,881 B2
(45) Date of Patent: Jun. 23, 2020

(54) ENERGY TRANSFER SYSTEMS AND METHODS (71) Applicant: GM Global Technology Operations LLC, Detroit, MI (US)

(72) Inventors: Steven A. Tarnowsky, West Bloomfield, MI (US); Goro Tamai, Bloomfield Hills, MI (US); Anthony J. Corsetti, Rochester Hills, MI (US); Kunaal Verma, Royal Oak, MI (US); Donald R. Gignac, Waterford, MI (US); Freddy V. Rayes, Shelby Township, MI (US); Apral S. Hara, LaSalle (CA); Allan K. Lewis, Windsor (CA); William Marsh, Austin, TX (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/153,884

(22) Filed: Oct. 8, 2018

(65) Prior Publication Data

US 2020/0108725 A1    Apr. 9, 2020

(51) Int. Cl.
*B60L 53/66* (2019.01)
*B60L 58/21* (2019.01)
(Continued)

(52) U.S. Cl.
CPC ............. *B60L 53/665* (2019.02); *H04W 4/40* (2018.02); *H04W 12/06* (2013.01); *B60L 58/21* (2019.02);
(Continued)

(58) Field of Classification Search
CPC .... B60L 53/665; B60L 58/21; B60L 2230/16; B60L 2230/40; B60L 53/66; H04W 4/40; H04W 12/06
See application file for complete search history.

(56) References Cited

U.S. PATENT DOCUMENTS 9,778,653 B1 * 10/2017 McClintock ......... B67D 7/0401
10,391,872 B2 * 8/2019 Gaither .................. B60L 53/12
(Continued)

OTHER PUBLICATIONS

U.S. Appl. No. 15/877,414, filed Jan. 23, 2018, Wei et al.
(Continued)

*Primary Examiner* — Vuthe Siek (57) ABSTRACT

A communication module is configured to obtain, from a first computing device associated with an energy receiver, an energy request. The energy request includes a location of the energy receiver and an amount of energy requested. A selection module is configured to generate a list of energy sources available to satisfy the energy request. The communication module is further configured to: transmit the list of energy sources to the first computing device for display; receive, from the first computing device, a selection of one energy source from the list of energy sources; and transmit, to the first computing device and a second computing device associated with the selected one energy source, a location at which the energy request is to be fulfilled. An energy transfer module is configured to selectively enable an electrical energy transfer from the selected one energy source to the energy receiver.

20 Claims, 7 Drawing Sheets

(51) Int. Cl.
*H04W 12/06* (2009.01)
*H04W 4/40* (2018.01)
(52) U.S. Cl.
CPC ....... *B60L 2230/16* (2013.01); *B60L 2230/40* (2013.01)

(56) References Cited

U.S. PATENT DOCUMENTS

| | | | |
|---|---|---|---|
| 2011/0204720 A1* | 8/2011 | Ruiz | G06Q 50/06 307/66 |
| 2016/0029342 A1* | 1/2016 | Winand | G06Q 10/10 455/573 |
| 2017/0274780 A1* | 9/2017 | de Hoog | H02J 7/0063 |

OTHER PUBLICATIONS

U.S. Appl. No. 15/877,413, filed Jan. 23, 2018, Wei et al.
U.S. Appl. No. 15/877,416, filed Jan. 23, 2018, Wei et al.
K. Zaghib et al.; "Safe and fast-charging Li-ion battery with long shelf life for power applications"; Journal of Power Sources 196 (2011); available online Nov. 24, 2010; pp. 3949-3954.
U.S. Appl. No. 15/995,640, filed Jun. 1, 2018, John A. Cafeo et al.
U.S. Appl. No. 16/058,294, filed Aug. 8, 2018, John A. Cafeo et al.

* cited by examiner

ENERGY TRANSFER SYSTEMS AND METHODS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for energy transfer between an energy source and an energy receiver, such as between two vehicles.

A powertrain transfers torque from one or more torque-generating devices through a transmission to a driveline. Torque-generating devices may include internal combustion engines and motor generator units (MGUs).

Hybrid vehicles may include an internal combustion engine and one or more MGUs. Electric vehicles may include one or more MGUs and no internal combustion engine. Other types of vehicles may include an internal combustion engine and no MGUs.

An MGU can operate as a motor to generate a torque input to the transmission independently of a torque input from the internal combustion engine. An MGU can also operate as a generator to transform vehicle kinetic energy to electrical energy that is storable in a battery pack. A battery management module regulates power flow between an energy source, the battery pack, the MGU, and accessory loads.

SUMMARY

In a feature, an energy transfer method includes obtaining, by a server from a first computing device associated with an energy receiver, an energy request, where the energy request includes (i) a location of the energy receiver and (ii) an amount of energy requested. The method further includes generating, by the server, a list of energy sources available to satisfy the energy request. The method further includes transmitting, by the server, the list of energy sources to the first computing device for display on a display of the first computing device. The method further includes receiving, from the first computing device, a selection of one energy source from the list of energy sources. The method further includes transmitting, by the server, to the first computing device and a second computing device associated with the selected one energy source, by the server, a location at which the energy request is to be fulfilled. The method further includes selectively enabling, by the server, an electrical energy transfer from the selected one energy source to the energy receiver.

In further features, the energy transfer method further includes charging, by the server, an account associated with the energy receiver based on an amount of energy transferred from the selected one energy source to the energy receiver; and crediting, by the server, a second account associated with the selected one energy source based on the amount of energy transferred from the selected one energy source to the energy receiver.

In further features, selectively enabling includes: generating, by the server, an energy access key for the electrical energy transfer from the selected one energy source to the energy receiver; transmitting, by the server, the energy access key to the first computing device; receiving, by the server, the energy access key from the first computing device; in response to receipt of the energy access key from the first computing device, by the server, authenticating the energy access key; and in response to the authentication, by the server, enabling the selected one energy source to transfer energy to the energy receiver.

In further features, the energy transfer method further includes selectively disabling, by the server, the electrical energy transfer from the selected one energy source to the energy receiver.

In further features, the energy transfer method further includes selectively disabling, by the server, the electrical energy transfer from the selected one energy source to the energy receiver based on an amount of energy transferred from the selected one energy source to the energy receiver.

In further features, selectively disabling the electrical energy transfer includes disabling the electrical energy transfer from the selected one energy source to the energy receiver when the amount of energy transferred from the selected one energy source to the energy receiver is equal to the amount of energy requested included in the energy request.

In further features, the energy transfer method further includes one of revoking and electronically marking the energy access key, by the server, when the amount of energy transferred from the selected one energy source to the energy receiver is equal to the amount of energy requested included in the energy request.

In further features, the energy access key includes a date and time range for which the energy access key is active, and the authentication of the energy access key includes determining whether a present date and time are within the present date and time range.

In further features, generating the list of energy sources available to satisfy the energy request includes, by the server, limiting the list of energy sources to energy sources having more than the amount of energy requested included in the energy request.

In further features, generating the list of energy sources available to satisfy the energy request includes, by the server, limiting the list of energy sources to energy sources configured to transfer energy via one type of conduit.

In further features, generating the list of energy sources available to satisfy the energy request includes, by the server, limiting the list of energy sources to energy sources configured to transfer energy via one type of connector.

In further features, generating the list of energy sources available to satisfy the energy request includes, by the server, limiting the list of energy sources to energy sources with present locations that are within a predetermined distance of a present location of the energy receiver.

In further features, the energy request includes a maximum price for the amount of energy requested; and generating the list of energy sources available to satisfy the energy request includes, by the server, limiting the list of energy sources to energy sources having associated energy selling prices that are less than the maximum price.

In further features, the energy receiver includes the first computing device.

In further features, the first computing device is not included in the energy receiver.

In further features, energy sources include vehicles and the energy receiver includes a vehicle.

In further features, energy sources include vehicles, charging stations, and utility connections of buildings.

In a feature, an energy share system includes a communication module configured to obtain, from a first computing device associated with an energy receiver, an energy request, where the energy request includes (i) a location of the energy receiver and (ii) an amount of energy requested. A selection module is configured to generate a list of energy sources available to satisfy the energy request. The communication module is further configured to: transmit the list of energy sources to the first computing device for display on a display of the first computing device; receive, from the first computing device, a selection of one energy source from the list of energy sources; and transmit, to the first computing device and a second computing device associated with the selected one energy source, a location at which the energy request is to be fulfilled. An energy transfer module is configured to selectively enable an electrical energy transfer from the selected one energy source to the energy receiver.

In further features, the energy share system includes a payment module configured to: charge an account associated with the energy receiver based on an amount of energy transferred from the selected one energy source to the energy receiver; and credit a second account associated with the selected one energy source based on the amount of energy transferred from the selected one energy source to the energy receiver.

In further features, the energy share system includes a key module configured to generate an energy access key for the electrical energy transfer from the selected one energy source to the energy receiver. The communication module is further configured to: transmit the energy access key to the first computing device; and receive the energy access key from the first computing device. The key module is further configured to authenticate the energy access key in response to receipt of the energy access key from the first computing device. The energy transfer module is further configured to enable the selected one energy source to transfer energy to the energy receiver in response to the authentication.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Electric vehicles may include one or more motor generator units (MGUs). An MGU can operate as a motor to generate a torque input to the transmission independently of a torque input from an internal combustion engine. An MGU can also operate as a generator to transform vehicle kinetic energy to electrical energy that can be stored in a battery pack.

Because battery packs have a limited range, a driver may wish to extend the range of their vehicle beyond a maximum range provided by a single charge of the battery pack. For example, when a driver of a vehicle is traveling to a destination that is further than a maximum range of the battery pack, the battery pack will need to be charged at least once before reaching the destination.

A driver of the vehicle may wish to identify energy sources to charge the battery pack that are within a predetermined distance of the vehicle in real time. According to the present disclosure, an energy share system locates energy sources and manages the transfer of energy from an energy source to an energy receiver (e.g., the vehicle).

Figure 1:
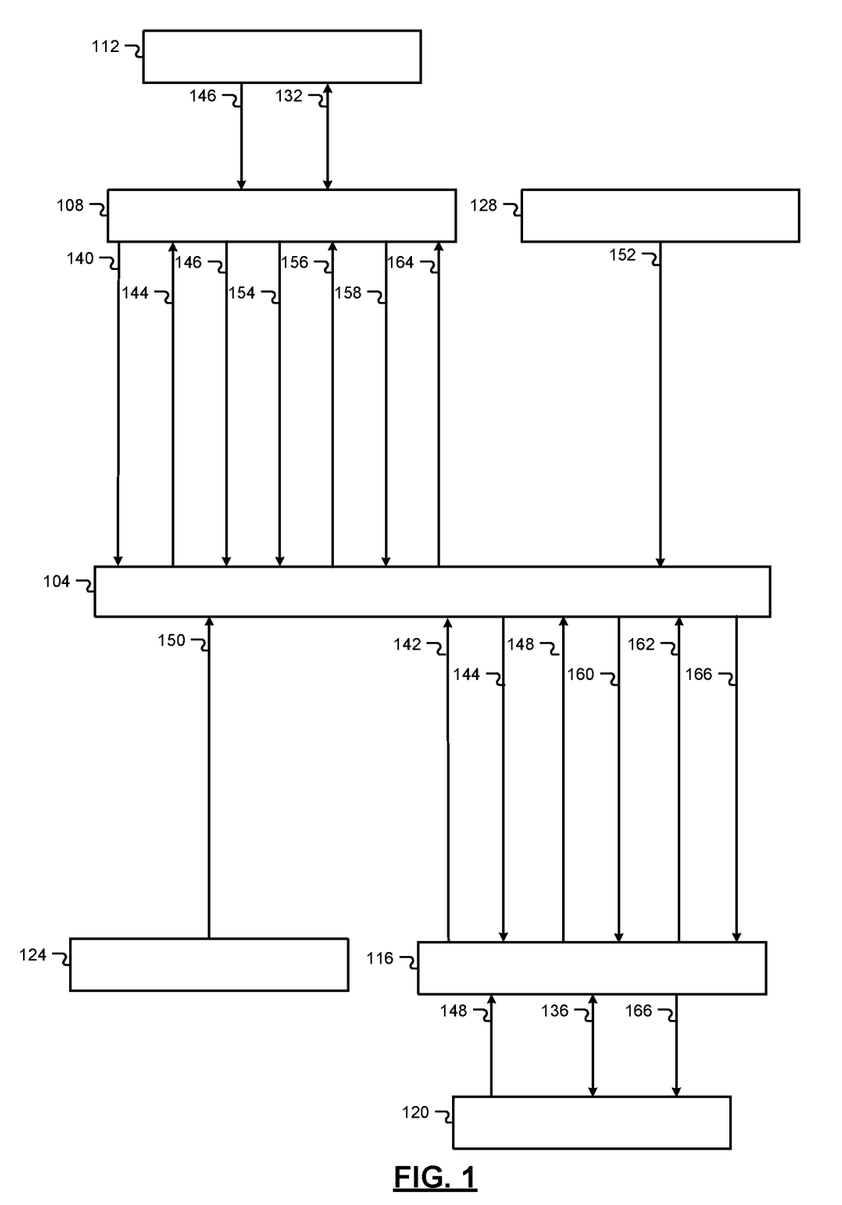
FIG. 1 is a functional block diagram of an example energy sharing system.

FIG. 1 is a functional block diagram of an example energy sharing system. An energy share server 104 facilitates the sale and transfer of energy from a first user of a first computing device 108 associated with an energy receiver 112 to a second user of a second computing device 116 associated with an energy source 120.

The energy source 120 includes a device that outputs electrical energy. Examples of energy sources include vehicles, charging stations, utility connections of buildings (e.g., residential or commercial), batteries and battery packs, and other types of devices that store and/or can output electrical energy. The energy receiver 112 includes a device that receives electrical energy. Examples of energy receivers include vehicles, batteries and battery packs, and other types of devices that store and consume electrical energy.

A conduit 124 electrically conducts energy from the energy source 120 to the energy receiver 112. The conduit 124 may include a computing device such as a microcontroller and/or global positioning system (GPS) for location tracking. The conduit 124 may include, for example, a bidirectional charge connector (e.g., an electrical conductor) that electrically conducts energy from one electric vehicle (an energy source) to another electric vehicle (an energy receiver).

A connector 128 electrically connects the energy source 120 and the energy receiver 112. For example, in the above-mentioned example of the conduit 124 being an electrical conductor, the connector 128 may include electrical connectors connected to ends of the electrical conductor.

The first computing device 108, the second computing device 116, the energy receiver 112, the energy source 120, the conduit 124, and the connector 128 communicate with the energy share server 104 via one or more networks (not specifically shown). Examples of computing devices include mobile phones, tablet devices, laptop computers, desktop computers, microcontrollers, and other types of computing devices. Examples of networks include wireless networks, wired networks, and combination wireless and wired networks.

The energy receiver 112 and the energy source 120 are shown as transmitting data through the first computing device 108 and the second computing device 116 through Bluetooth® Low Energy (BLE) communication links 132 and 136. In this example, the first and second computing devices 108 and 116 may transmit information regarding the energy receiver 112 and the energy source to the energy share server 104. However, the energy receiver 112 and the energy source 120 may directly transmit information to the energy share server 104 through one or more networks, such as a cellular network, a Wi-Fi network, a satellite network, or another type of network.

The first user of the first computing device 108 and the second user of the second computing device 116 create a first account 140 and a second account 142, respectively, with the energy share server 104. The first account 140 and the second account 142 each include payment information (e.g., credit card or bank account), name, address, and other suitable information related to the respective user. The energy share server 104 provides each registered account with a key pair 144 (e.g., a public key and a private key) that may be used to authenticate energy transfer transactions as discussed below.

The first account 140 and the second account 142 may be associated with one or more energy receivers, one or more energy sources, one or more conduits, and/or one or more connectors. The first user of the first account 140 and the second user of the second account 142 may create or establish a separate associated account for each energy source, each energy receiver, each conduit, and each connector. For example, the first user establishes an energy receiver account 146 for the energy receiver 112, and the second user establishes an energy source account 148 for the energy source 120, a conduit account 150 for the conduit 124, and a connector account 152 for the connector 128. Alternatively, the account of a user may include one or more linked sub accounts for energy sources, energy receivers, conduits, and connectors of that user.

The energy receiver account 146 and the energy source account 148 may include information such as a type of the energy receiver or a type of the energy source (e.g., a vehicle, a charge station, etc.), a classification (e.g., an energy source or an energy receiver), a make and model number, a location (e.g., geographical coordinates), a charging capability, power consumption, a present state-of-charge (SOC), a present maximum amount of energy for sale for the energy source 120, a unique identifier, a present availability, and other suitable information. The unique identifier may include a vehicle identification number (VIN), a radio-frequency identification number (RFID), quick response (QR) code, a media access control (MAC) address, or another suitable unique identifier of the energy source or energy receiver.

Any time there is a change in information for the energy receiver account 146 and/or the energy source account 148, the energy receiver account 146 and the energy source account 148 may be updated. For example, the energy source account 148 may be updated once every predetermined period (e.g., ten minutes) to reflect the present SOC of the energy source 120 and other present information.

The conduit account 150 and the connector account 152 may include information such as a unique identifier and/or a location (e.g., geographical coordinates). The unique identifier may include a radio-frequency identification number (RFID), quick response (QR) code, MAC address, or another suitable unique identifier.

The first user transmits an energy request 154 to the energy share server 104 using the first computing device 108. The energy request 154 includes an amount of energy that the first user is requesting to purchase, a distance the first user is willing to travel to purchase the energy, a maximum price the first user is willing to pay per unit of energy, and other suitable information.

While the example is provided that the first user submits the energy request 154 via the first computing device 108, in some implementations the first user may submit the energy request 154 directly via the energy receiver 112. In this example, the energy receiver 112 may include the first computing device 108. When the first computing device 108 is a mobile device and the energy receiver 112 is a vehicle, the first computing device 108 may be connected with vehicle's infotainment module using, for example, BLE or another suitable form of communication.

Based on the energy request 154, the energy share server 104 determines a list of energy sources 156 including energy sources that can satisfy the criteria contained in the energy request 154 and the information obtained from the energy receiver account 146. For example, the energy share server 104 may include in the list of energy sources 156, energy sources within the distance specified by the energy request 154, that have the requested amount of energy available, and that are willing to sell the requested amount of energy for less than the maximum price the first user is willing to pay per unit of energy, and energy sources configured to transfer energy via conduits or connectors associated with the energy receiver 112. The first computing device 108 displays the list of energy sources 156 that can satisfy the criteria contained in the energy request 154 and the information obtained from the energy receiver account 146 on a display of or connected to the first computing device 108.

The first user selects one of the energy sources of the list of energy sources 156 via the first computing device 108. The first computing device 108 transmits a selection 158 of one of the energy sources (e.g., the energy source 120) from the list of energy sources 156 to the energy share server 104.

In response to receiving the selection 158, the energy share server 104 may generate additional lists, such as a list of conduits and/or a list of connectors based on the selection 158 of the first user. For example, when there is more than one conduit associated with the energy source 120, the energy share server 104 may generate a list of conduits that are present at the location of the energy source 120 and that are compatible with the energy receiver 112. As another example, when there is more than one connector associated with the energy source 120, the energy share server 104 may generate a list of connectors that are present at the location of the energy source 120 and that are compatible with the energy receiver 112. The first computing device 108 may display these lists and transmit selections from these lists to the energy share server 104.

Once the selection 158 has been received by the energy share server 104, the energy share server 104 transmits a transaction request 160 to the energy source 120 to confirm the details of the transaction. The transaction request 160 includes information such as the amount of energy to be transferred, a price at which the first user has agreed to purchase the energy from the energy source 120, and a location where the transfer is to take place. The location may be the same as or different than the present location of the energy source 120. The second user can confirm the transaction request via the second computing device 116. The second computing device 116 transmits a transaction confirmation 162 to the energy share server 104.

Upon receiving the transaction confirmation 162 from the energy source 120, the energy share server 104 generates an energy access key 164 based on the energy request 154 and the account of the energy source 120. The energy share server 104 then transmits the energy access key 164 to the first computing device 108.

The first user uses the energy access key 164 to initiate the energy transfer. Upon receipt of the energy access key 164, the energy share server 104 enables the transfer of energy from the energy source 120 by transmitting an enable/ disable signal 166 in a first state to the energy source 120. The energy source 120 outputs power to the energy receiver 112 in response to the enable/disable signal 166 being in the first state. When the energy transfer is complete (when the requested amount of energy has been transferred to the energy receiver 112), the energy share server 104 transmits the enable/disable signal 166 in a second state to the energy source 120. The energy source 120 does not output power to the energy receiver 112 when the enable/disable signal 166 is in the second state.

Figure 2:
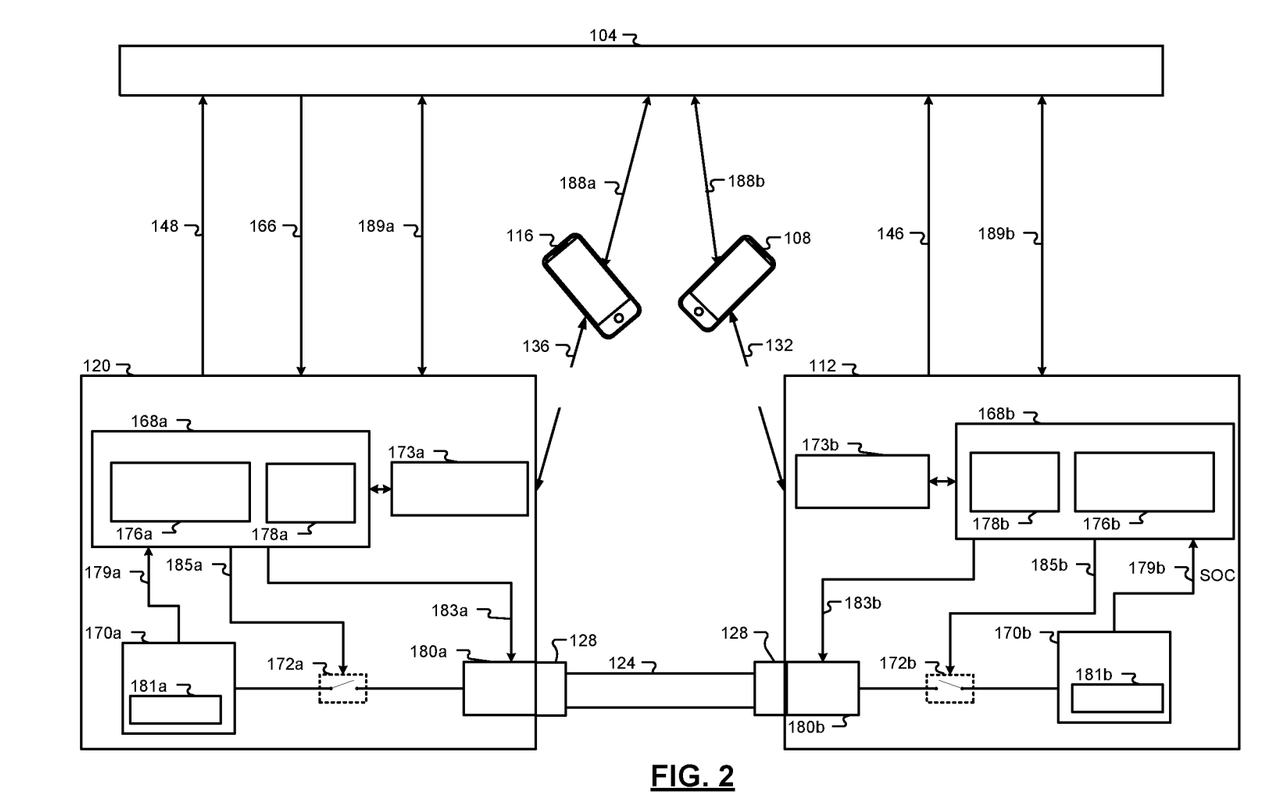
FIG. 2 is a functional block diagram of an example implementation of an energy sharing system between two vehicles.

FIG. 2 includes a functional block diagram of an example implementation of an energy share system where the energy source 120 is a vehicle and the energy receiver 118 is a vehicle. The energy source 120 includes a battery management module 168a, a battery pack 170a, a charge port 180a, a switch 172a, and a transceiver module 173a. The energy receiver 112 includes a battery management module 168b, a battery pack 170b, a charge port 180b, a switch 172b, and a transceiver module 173b.

The transceiver module 173a includes one or more transceivers and antennas. The one or more transceivers wirelessly receive information and transmit information via the one or more antennas. Examples of transceivers include, for example, cellular transceivers, Bluetooth® transceivers, WiFi transceivers, satellite transceivers, and other types of transceivers. For example, the energy source 120, through the transceiver module 173a, establishes the BLE link 136 with the second computing device 116. The second computing device 116 wirelessly communicates 188a with the energy share server 104, such as via a cellular network and/or a WiFi network.

The energy source 120, may also wirelessly communicate 189a with the energy share server 104 via the transceiver module 173a. For example, the energy source 120 may transmit information for the energy source account 148 and other information to the energy share server 104.

The battery management module 168a is configured to selectively charge and discharge the battery pack 170a. The battery management module 168a includes a switch control module 176a and a SOC module 178a. The switch control module 176a controls the switch 172a based on the enable/disable signal 166. When the enable/disable signal 166 is received from the energy share server 104 in the first state, the switch control module 176a closes the switch 172a via an open/close signal 185a so that power may be transferred from the battery pack 170a of the energy source 120 to the battery pack 170b of the energy receiver 112. For example, the charge port 180a of the energy source 120 is electrically connected with the charge port 180b of the energy receiver 112 through the conduit 124 so that power may flow from the battery pack 170a of the energy source 120 to the battery pack 170b of the energy receiver 112. When the enable/disable signal 166 is received from the energy share server 104 in the second state, the switch control module 176a opens the switch 172a via the open/close signal 185a so that power is cannot be transferred to the energy receiver 112.

The SOC module 178a estimates a SOC 179a of the battery pack 170a based on one or more sensors 181a. The SOC module 178a may determine the SOC 179a of the battery pack 170a, for example, based on voltages of the battery pack 170a. For example, the SOC module 178a may determine the SOC 179a using one of a lookup table and an equation that relates voltages of the battery pack 170a to the SOC 179a.

The SOC module 178a may determine the SOC 179a, additionally or alternatively, based on the current flow to and from the battery pack 170a. For example, the SOC module 178a may determine a mathematical integral of current over each predetermined period and add the integration results to determine the SOC 179a of the battery pack 170a. As another example, the SOC module 178a may scale or offset the voltage based on the current, the scalar of offset determined based on the current, and determine the SOC 179a using one of a lookup table and an equation that relates these scaled or offset voltages to the SOC 179a of the battery pack 170a.

The SOC module 178a may determine the SOC 179a further based on one or more temperatures of the battery pack 170a. The temperatures may be, for example, measured using one or more temperature sensors. The SOC 179a may be provided as a percentage between 0 percent SOC indicative of 0 charge (i.e., fully discharged) and 100 percent SOC indicative of the battery pack 170a being fully charged.

The battery pack 170a may include multiple battery cells. Each battery cell includes an anode and a cathode. The one or more sensors 181a are in operative communication with each battery cell and are operatively connected to the battery management module 168a. The one or more sensors 181a are configured to monitor battery parameters. For example, the sensors 181a may monitor parameters indicative of the respective SOC of each battery cell, such as voltage, current, temperature, etc.

The charge port 180a controls access to an input/output conductor that is connected to the switch 172a. The charge port 180a may include an electronic lock that may be locked and unlocked with a lock/unlock signal 183a in response to the battery management module 168a receiving the enable/disable signal 166 from the energy share server 104. The charge port 180a prevents access to the input/output conductor when the charge port 180a is locked. The charge port 180a allows access to the input/output conductor when the charge port 180a is unlocked. The battery management module 168a may control opening and closing of the switch 172a and locking and unlocking of the charge port 180a, for example, based on signals from the energy share server 104.

The transceiver module 173b includes one or more transceivers and antennas. The one or more transceivers wirelessly receive information and transmit information via the one or more antennas. Examples of transceivers include, for example, cellular transceivers, Bluetooth® transceivers, WiFi transceivers, satellite transceivers, and other types of transceivers. For example, the energy receiver 112, through the transceiver module 173b, establishes the BLE link 132 with the first computing device 108. The first computing device 108 wirelessly communicates 188b with the energy share server 104, such as via a cellular network and/or a WiFi network.

The energy receiver 112, may also wirelessly communicate 189b with the energy share server 104 via the transceiver module 173b. For example, the energy source 120 may transmit information for the energy source account 148 and other information to the energy share server 104.

The battery management module 168b is configured to selectively charge and discharge the battery pack 170b. The battery management module 168b includes a switch control module 176b and a SOC module 178b. The switch control module 176b controls the switch 172b based on signals from the energy share server 104. The switch control module 176b selectively closes the switch 172b via an open/close signal 185b so that power may be transferred from the battery pack 170b of the energy source 120 to the battery pack 170b of the energy receiver 112 via the conduit 124. The switch control module 176b opens the switch 172b via the open/ close signal 185b so that power cannot be transferred to or from the energy receiver 112.

The SOC module 178b estimates a SOC 179b of the battery pack 170b based on one or more sensors 181b. The SOC module 178b may determine the SOC 179b of the battery pack 170b, for example, based on voltages of the battery pack 170b. For example, the SOC module 178b may determine the SOC 179b using one of a lookup table and an equation that relates voltages of the battery pack 170b to the SOC 179b.

The SOC module 178b may determine the SOC 179b, additionally or alternatively, based on the current flow to and from the battery pack 170b. For example, the SOC module 178b may determine a mathematical integral of current over each predetermined period and add the integration results to determine the SOC 179b of the battery pack 170b. As another example, the SOC module 178b may scale or offset the voltage based on the current, the scalar of offset determined based on the current, and determine the SOC 179b using one of a lookup table and an equation that relates these scaled or offset voltages to the SOC 179b of the battery pack 170b.

The SOC module 178b may determine the SOC 179b further based on one or more temperatures of the battery pack 170b. The temperatures may be, for example, measured using one or more temperature sensors. The SOC 179b may be provided as a percentage between 0 percent SOC indicative of 0 charge (i.e., fully discharged) and 100 percent SOC indicative of the battery pack 170b being fully charged.

The battery pack 170b may include multiple battery cells. Each battery cell includes an anode and a cathode. The one or more sensors 181b are in operative communication with each battery cell and are operatively connected to the battery management module 168b. The one or more sensors 181b are configured to monitor battery parameters. For example, the sensors 181b may monitor parameters indicative of the respective SOC of each battery cell, such as voltage, current, temperature, etc.

Figure 3:
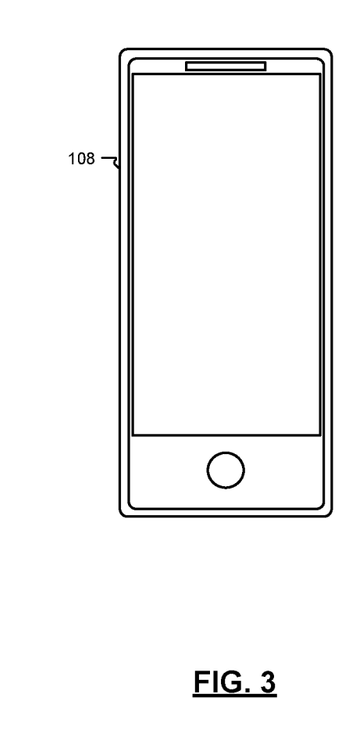
FIG. 3 is a front view of an example computing device.
Figure 4:
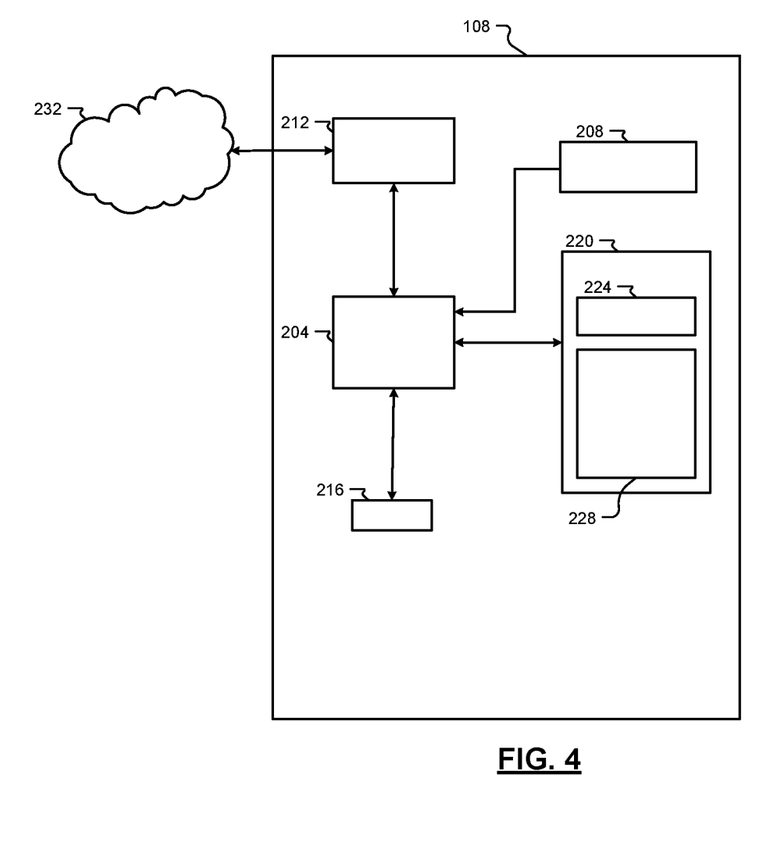
FIG. 4 is a functional block diagram of an example implementation of a computing device.

The charge port 180b controls access to an input/output conductor that is connected to the switch 172b. The charge port 180b may include an electronic lock that may be locked and unlocked with a lock/unlock signal 183b in response to the battery management module 168b receiving a signal from the energy share server 104. The charge port 180b prevents access to the input/output conductor when the charge port 180b is locked. The charge port 180b allows access to the input/output conductor when the charge port 180b is unlocked. The battery management module 168b may control opening and closing of the switch 172b and locking and unlocking of the charge port 180b, for example, based on signals from the energy share server 104. FIG. 3 includes a front view of an example implementation of the first computing device 108. FIG. 4 includes a functional block diagram of an example implementation of the first computing device 108. Referring now to FIGS. 3 and 4, the first computing device 108 includes a central processing unit (CPU) or processor 204, one or more input devices 208 (e.g., touchscreen display, a microphone, one or more switches, etc.), a display 216 (e.g., the touchscreen display), one or more other output devices (not shown), a network interface 212, and memory 220. While the input devices 208 and the display 216 are illustrated as components of the first computing device 108, input devices and output devices (e.g., a display) may be peripheral devices. Also, while the example of a single processor is provided, the first computing device 108 may include two or more processors.

The network interface 212 connects the first computing device 108 to the network 232. For example, the network interface 212 may include a wired interface (e.g., an Ethernet interface) and/or a wireless interface (e.g., a Wi-Fi, Bluettoh®, near field communication (NFC), or another wireless interface). The processor 204 of the first computing device 108 executes an operating system (OS) 224 and one or more other applications. The processor 204 executes the operating system (OS) 224 and one or more server applications, such as an energy share application 228 to display user interfaces for generating and transmitting the energy request 154. The second computing device 116 may be similarly configured.

Figure 5:
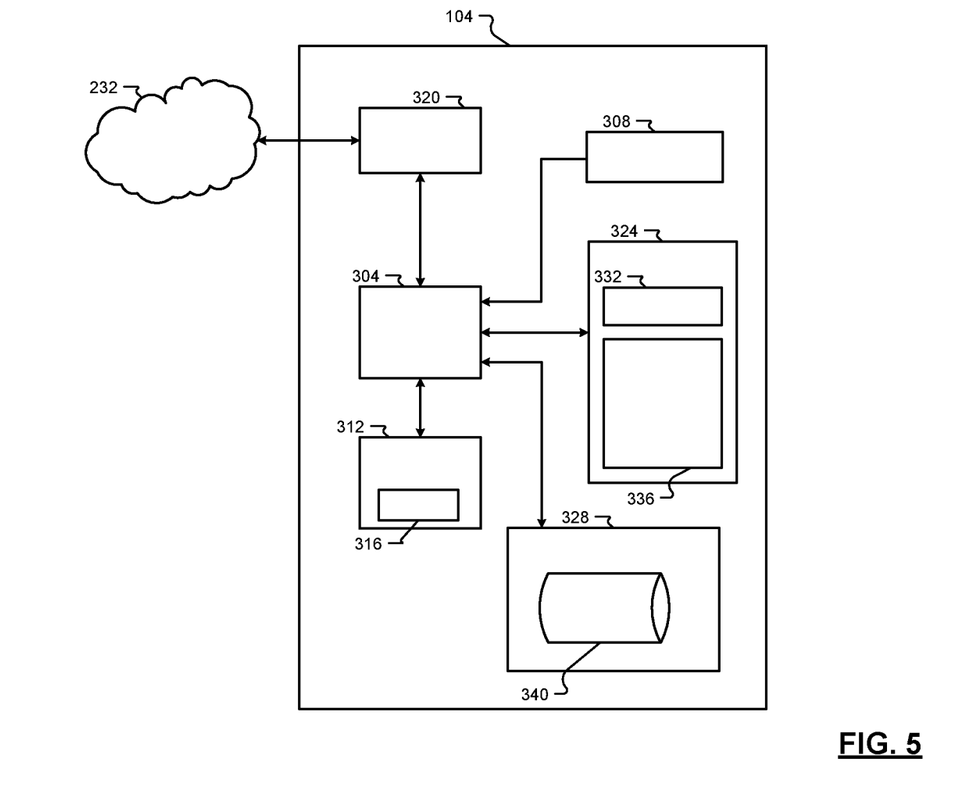
FIG. 5 is a functional block diagram of an example implementation of an energy share server.

FIG. 5 includes a functional block diagram of an example implementation of the energy share server 104. The energy share server 104 includes a processor 304, one or more input devices 308 (e.g., a keyboard, touchpad, mouse, etc.), a display subsystem 312 including a display 316, a network interface 320, a memory 324, and a bulk storage 328. While the input devices 308 and the display 316 are illustrated as components of the energy share server 104, input devices and output devices (e.g., a display) may be peripheral devices. Also, while the example of a single processor is provided, the energy share server 104 may include two or more processors.

The network interface 320 connects the energy share server 104 to computing devices (e.g., the first computing device 108 and the second computing device 116), conduits (e.g., the conduit 124), and connectors (e.g., the connector 128) via one or more networks. For example, the network interface 320 may connect the energy share server 104 to the first computing device 108 and other computing devices via the network 232. The network interface may include a wired interface (e.g., an Ethernet interface) and/or a wireless interface (e.g., a Wi-Fi, Bluetooth®, near field communication (NFC), or another wireless interface). The memory 324 may include volatile or nonvolatile memory, cache, or other type of memory. The bulk storage 328 may include flash memory, one or more hard disk drives (HDDs), or other bulk storage device.

The processor 304 executes an operating system (OS) 332 and one or more energy share applications, such as an energy share application 336. The bulk storage 328 may store one or more databases 340 that store data structures used by the energy share server 104 applications to perform functions described herein. The processor 304 executes the energy share application 336 to facilitate energy transfer transactions between the energy receivers and energy sources. Operations discussed herein as being performed by the energy share server 104 are performed by the energy share server 104 (more specifically the processor 304) during execution of the energy share application 336. While functions described herein are being performed by the energy share server 104, functionality of the energy share server 104 may be distributed amongst two or more servers.

Figure 6:
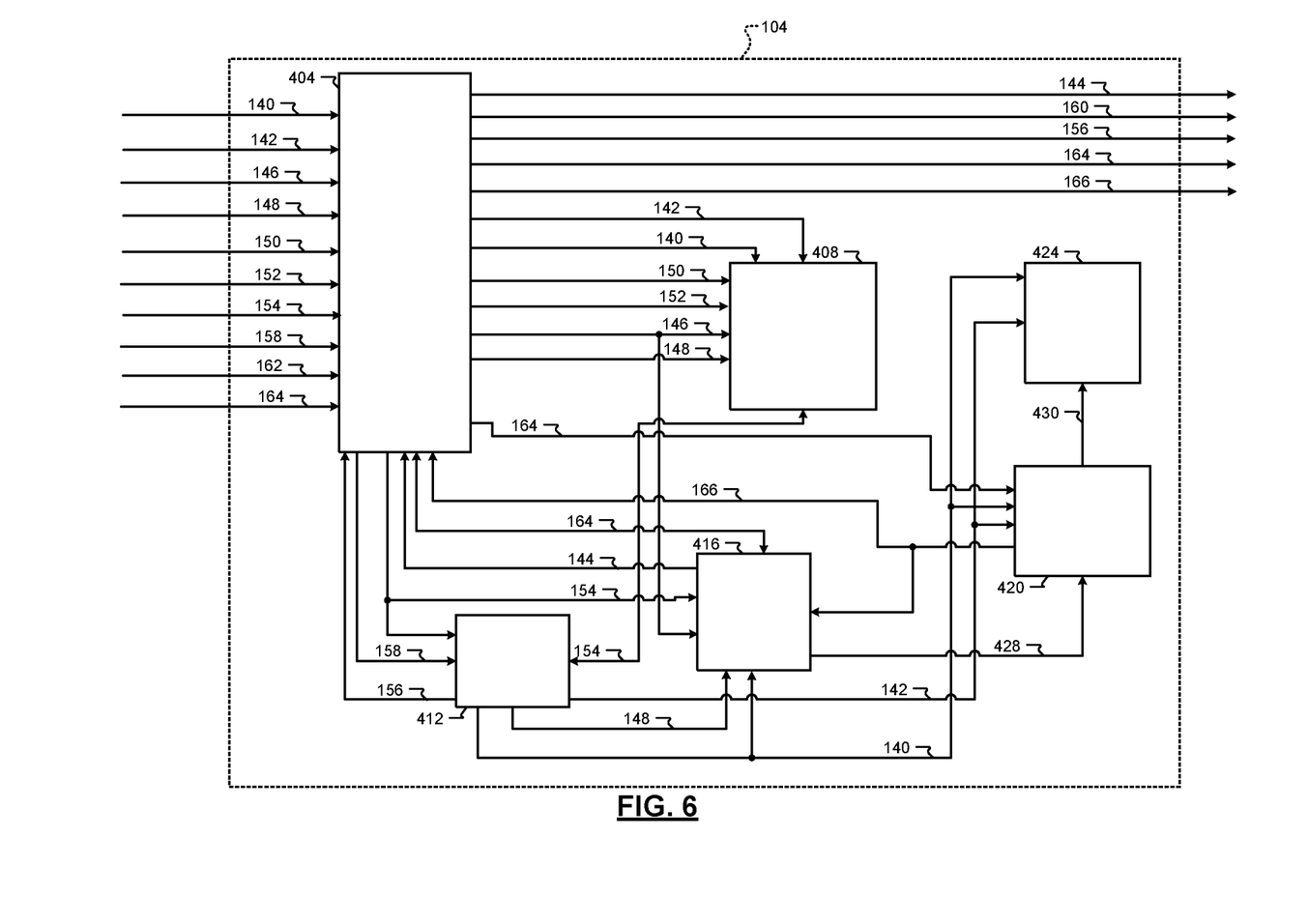
FIG. 6 is a functional block diagram of an example implementation of an energy share server.

FIG. 6 includes a functional block diagram of an example implementation of the energy share server 104. The energy share server 104 includes a communication module 404, an account module 408, a selection module 412, a key module 416, an energy transfer module 420, and a payment module 424.

The communication module 404 receives data and transmits data to the first computing device 108, the second computing device 116, the energy receiver 112, and the energy source 120. For example, the communication module 404 receives data for the energy source account 148 from the energy receiver 112 and stores the energy source account 148 to the account module 408. In another example, the communication module 404 receives an energy request 154 from the first computing device 108 and transmits the list of energy sources 156 to the first computing device 108.

The account module 408 stores accounts, such as the first account 140 and the second account 142, and respective account information. In response to receiving an indication from the communication module 404 that one of the accounts are unavailable, the account module 408 may flag the account. An energy source associated with a flagged account is removed from consideration from fulfilling the energy request 154. For example, the second user may indicate that one or more energy sources associated with the second account 142 are unavailable based on user input to the second computing device 116. In other instances, the energy share server 104 may determine the energy source 120 is unavailable based on the energy source account 148, such as when the SOC of the energy source 120 is below a predetermined SOC. The energy share server 104 may exclude energy sources associated with flagged accounts from lists of sources.

The selection module 412 receives the energy request 154 from the communication module 404 and generates the list of energy sources 156 that meet the criteria of the energy request 154 and the information obtained from the energy receiver account 146. For example, the selection module 412 may list only energy sources that are within a predetermined distance of the energy receiver 112. The selection module 412 may also exclude from the list of energy sources 156, energy sources that are currently fulfilling or scheduled to fulfill other energy requests. In instances such as when there is more than one conduit or more than one connector associated with the energy source 120, the selection module 412 generates a list of conduits and/or a list of connectors in response to receiving a selection of the energy source 120 from the first computing device 108.

The key module 416 generates the key pair 144 including a public key and a private key for the first account 140 and for the second account 142. The energy share server 104 may generate the key pair, for example, using a public-key cryptography method or another suitable method.

The key module 416 also generates the energy access key 164 based on an account of the first computing device 108, the energy source 120, the energy receiver 112, and the energy request 154. The energy access key 164 includes an amount of energy to transfer, a time frame for which the energy access key 164 is valid, a make and model of the energy source 120, and a unique identifier of the energy source 120.

The energy share server 104 deactivates the energy access key 164 outside of the defined time frame. For example, the energy access key 164 may be valid from 2:00 PM to 5:00 PM of a specified date. If the current time is before 2:00 PM or after 5:00 PM on the specified date, the energy access key 164 is deactivated and energy transfer will not be allowed because of lack of a valid energy access key. The amount of energy that is indicated in the energy access key 164 may be equal to the amount of energy requested in the energy request 154 or may be greater than or less than this amount if the first user and the second user have agreed upon a different amount.

After the energy access key 164 has been generated, the key module 416 encrypts the energy access key 164 with the public key associated with a first account 140 to ensure an unintended receipt cannot access the energy access key 164. The private key of the key pair of the first account 140 is used to decrypt the energy access key 164. Upon receiving the energy access key 164 from the first computing device 108, the key module 416 validates the energy access key 164. If the energy access key is successfully validated, the key module 416 transmits a validation notification 428 to the energy transfer module 420. The first user may initiate the energy transfer process based on the energy access key 164.

The energy transfer module 420 enables the energy source 120 to transfer energy in response to receiving the validation notification 428 from the key module 416. For example, if the energy source 120 is a vehicle, the energy transfer module 420 may unlock a charge port of the vehicle, remotely start the vehicle, and/or close the switch 172a via the enable/disable signal 166.

The energy transfer module 420 also monitors a transferred amount 430 of energy from the energy source 120. For example, the energy source 120 may monitor the transferred amount 430 of energy and transmit the transferred amount 430 of energy to the energy transfer module 420. When the transaction is complete (when the transferred amount 430 of energy is equal to the amount of energy requested in the energy request 154), the energy transfer module 420 disables the energy source 120 from transferring any further energy via the enable/disable signal 166. For example, the transferred amount 430 of energy may be determined based on a change in the SOC 179a of the energy source 120 or a SOC 176b of the energy receiver 112. The energy transfer module 420 also instructs the key module 416 to delete or revoke the energy access key 164, and the energy transfer module 420 may flag the energy access key 164 so that the energy access key 164 can no longer be validated.

The payment module 424 facilitates payment between the first account 140 and the second account 142 based on the transferred amount 430 of energy received from the energy transfer module 420. In response to receiving the transferred amount 430, the payment module 424 determines a dollar amount for the energy transaction, charges the first account 140 the dollar amount and credits the dollar amount to the second account 142.

Figure 7:
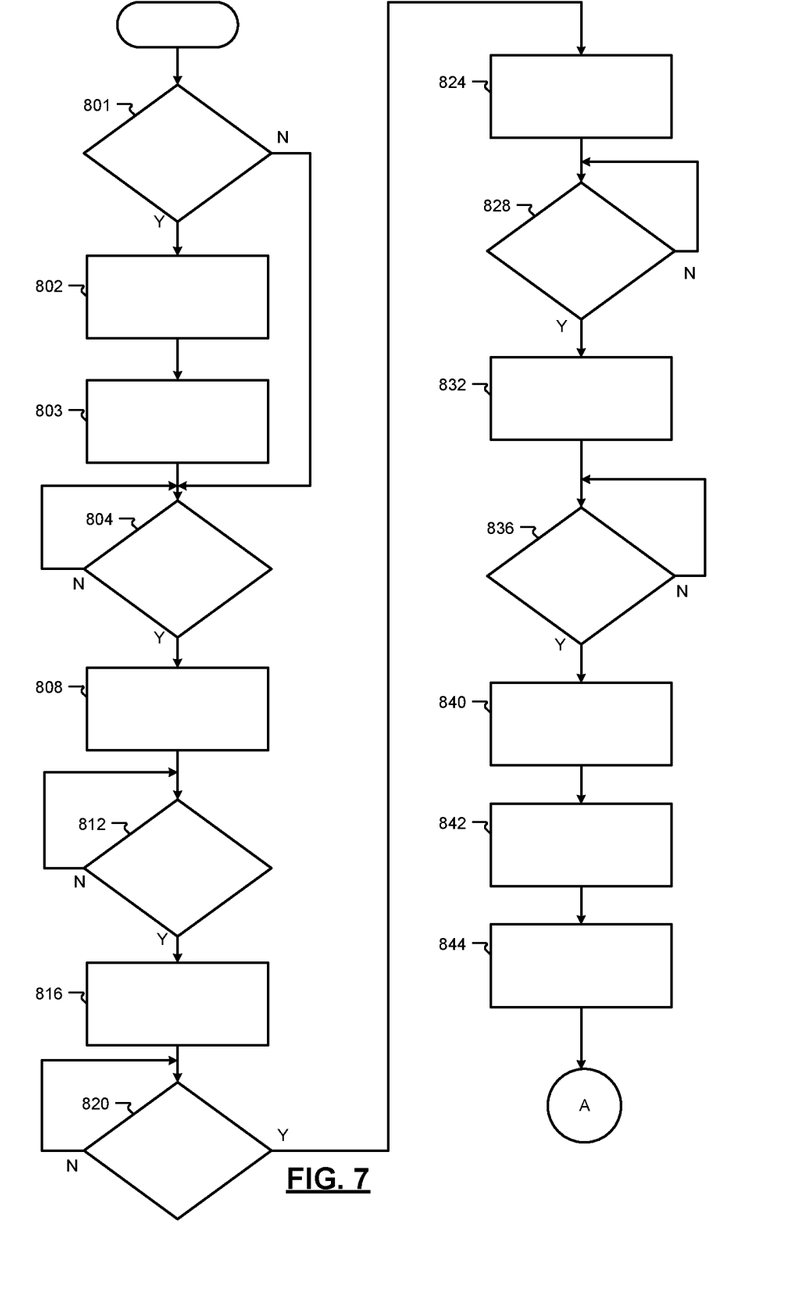
FIGS. 7 and 8 are flowcharts depicting an example method performed by an energy share server.
Figure 8:
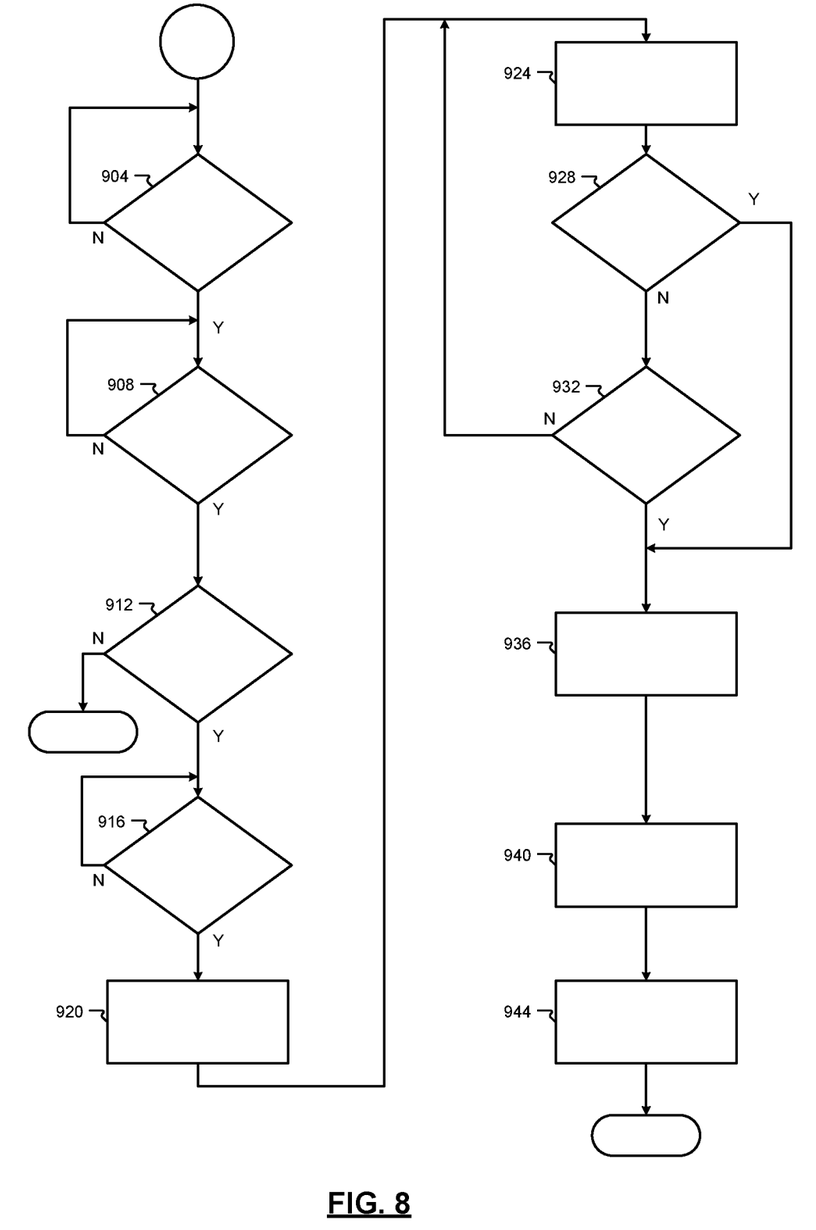

FIGS. 7 and 8 depict an example method performed by the energy share server 104. At 801, the account module 408 determines whether a new account request has been requested. If so, control continues at 802; otherwise, control continues at 804. At 802, the key module 416 generates and transmits a key pair for the new account and control continues at 803. At 803, the account module 408 receives and stores user information to the newly created account.

At 804, the selection module 412 determines whether an energy request 154 is received from the first computing device 108. If so, control continues at 808; otherwise, control waits for the energy request 154 to be received. At 808, the selection module 412 generates the list of energy sources 156 that are within the predetermined distance of the location of the energy receiver 112 and/or the first computing device 108. At 812, the selection module 412 determines whether a selection of an energy source from the list of energy sources 156 has been received. If so, control continues at 816; otherwise, control waits for a selection of an energy source to be received.

At 816, the selection module 412 generates a list of conduits based on conduits that are associated with the energy source 120 (the selected one of the energy sources) and that are compatible with the energy receiver 112. At 820, the selection module 412 determines whether a conduit has been selected. If so, control continues at 824; otherwise, control waits at 820. In instances when there is only one conduit associated with the energy source 120, the selection module 412 will assign that conduit to the transaction and skip blocks 816 and 820. In other instances, when there are multiple conduits available at the energy source 120, the selection module 412 may wait for a conduit to be selected.

At 824, the selection module 412 generates a list connectors that are associated with the energy source 120 and compatible with the energy receiver 112 and the conduit 124. At 828, the selection module 412 determines whether a connector has been selected. If so, control continues at 832; otherwise, control waits at 828. In instances such as when there is only one type of connector, control will assign that type of connector to the transaction and skip steps 824 and 828. In other instances, when there are multiple connectors available at the energy source 120, the selection module 412 may wait for a connector to be selected.

At 832, the communication module 404 transmits the transaction request 160 to the second computing device 116 to confirm the energy transfer transaction, and control continues at 836. At 836, the key module 416 determines whether the transaction confirmation 162 has been received from the second computing device 116. If so, control continues at 840; otherwise, control waits at 836 for the transaction confirmation 162 to be received. At 840, the key module 416 generates the energy access key 164. At 842, the key module 416 encrypts the energy access key 164 with the public key associated with the first account 140. At 844, the communication module 404 transmits the energy access key 164 to the first computing device 108 and control continues with 904 of FIG. 8.

Referring to FIG. 8, at 904, the key module 416 determines whether the energy access key 164 has been received from the first computing device 108. If so, control continues at 908; otherwise, control waits for the energy access key 164 to be received. At 908, the energy transfer module 420 determines whether the energy receiver 112 and the energy source 120 are present at the transfer location based on the present locations of the energy source 120 and the energy receiver 112. If so, control continues at 912; otherwise, control waits at 908.

At 912, the key module 416 validates the energy access key 164. If the energy access key 164 is validated, control continues at 916; otherwise, control ends. For example, the key module 416 may compare the energy access key 164 received from the first computing device 108 to the energy access key 164 provided to the first computing device 108 to ensure the energy access key 164 has not been modified.

At 916, the energy transfer module 420 determines whether the energy receiver 112 and the energy source 120 are electrically connected via the conduit 124. If so, control may continue at 920; otherwise, control may wait for an electrical connection to be established. For example, the first user may provide input to the first computing device 108 indicating that the energy receiver 112 and the energy source 120 are electrically connected via the conduit 124.

At 920, the energy transfer module 420 transmits the enable/disable signal 166 to the energy source 120 to enable the transfer of energy from the energy source 120 to the energy receiver 112. For example, the energy source 120 may close the switch 172a when the enable/disable signal 166 is in the first state. At 924, the energy transfer module 420 determines the transferred amount 430 of energy. In various implementations, the energy transfer module 420 may determine the transferred amount 430 of energy based on the SOC 179a of the battery pack 170a of the energy source 120.

At 928, the energy transfer module 420 determines whether the transfer is complete. For example, the energy transfer module 420 may determine whether the transferred amount 430 of energy is equal to the amount of energy requested via the energy request 154. If so, control continues at 936; otherwise, control continues at 932. The energy transfer module 420 determines that the energy transfer is complete, for example, when the transferred amount 430 of energy is equal to the amount of energy requested.

At 932, the energy transfer module 420 determines whether the transfer of energy from the energy source 120 to the energy receiver 112 has been interrupted. If so, control continues at 936; otherwise, control returns to 924. A transfer interruption occurs when the transferred amount 430 of energy is less than the requested amount of energy and no further energy is being transferred from the energy receiver 112 to the energy source 120. For example, the second user may interrupt a transfer by shutting down the energy source 120 during the energy transfer to prevent further transfer of energy.

At 936, the energy transfer module 420 sends the enable/disable signal in the second state to the energy source 120. The energy source 120 may open the switch 172a to prevent power transfer from the energy source 120 to the energy receiver 112 in response to receipt of the enable/disable signal in the second state. Opening the switch 172 prevents the energy source 120 from transferring energy to the energy receiver 112. At 940, the key module 416 flags, marks, or deletes the energy access key 164, and control continues at 944. At 944, the payment module 424 facilitates payment between from the first account 140 to the second account 142 for the transferred amount 430 of energy, and control may end.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An energy transfer method comprising:
   obtaining, by a server from a first computing device associated with an energy receiver, an energy request, wherein the energy request includes (i) a location of the energy receiver and (ii) an amount of energy requested;
   generating, by the server, a list of energy sources available to satisfy the energy request, wherein the energy sources include vehicles;
   transmitting, by the server, the list of energy sources to the first computing device for display on a display of the first computing device;
   receiving, from the first computing device, a selection of one energy source from the list of energy sources;
   transmitting, by the server, to the first computing device and a second computing device associated with the selected one energy source, by the server, a location at which the energy request is to be fulfilled; and
   by the server, selectively enabling an electrical energy transfer from the selected one energy source to the energy receiver,
   wherein the selected one energy source includes a vehicle, and
   wherein the selectively enabling an electrical energy transfer including unlocking a charge port of the vehicle, the charge port preventing access to an input/ output conductor of the vehicle when locked and allowing access to the input/output conductor of the vehicle when unlocked.

2. The energy transfer method of claim 1 further comprising:
by the server, charging an account associated with the energy receiver based on an amount of energy transferred from the selected one energy source to the energy receiver; and
by the server, crediting a second account associated with the selected one energy source based on the amount of energy transferred from the selected one energy source to the energy receiver.

3. The energy transfer method of claim 1 wherein selectively enabling includes:
generating, by the server, an energy access key for the electrical energy transfer from the selected one energy source to the energy receiver;
transmitting, by the server, the energy access key to the first computing device;
receiving, by the server, the energy access key from the first computing device;
in response to receipt of the energy access key from the first computing device, by the server, authenticating the energy access key; and
in response to the authentication, by the server, enabling the selected one energy source to transfer energy to the energy receiver.

4. The energy transfer method of claim 3 further comprising, by the server, selectively disabling the electrical energy transfer from the selected one energy source to the energy receiver.

5. The energy transfer method of claim 3 further comprising, by the server, selectively disabling the electrical energy transfer from the selected one energy source to the energy receiver based on an amount of energy transferred from the selected one energy source to the energy receiver.

6. The energy transfer method of claim 5 wherein selectively disabling the electrical energy transfer includes disabling the electrical energy transfer from the selected one energy source to the energy receiver when the amount of energy transferred from the selected one energy source to the energy receiver is equal to the amount of energy requested included in the energy request.

7. The energy transfer method of claim 6 further comprising, by the server, one of revoking and electronically marking the energy access key when the amount of energy transferred from the selected one energy source to the energy receiver is equal to the amount of energy requested included in the energy request.

8. The energy transfer method of claim 3 wherein the energy access key includes a date and time range for which the energy access key is active, and
wherein the authentication of the energy access key includes determining whether a present date and time are within the present date and time range.

9. The energy transfer method of claim 1 wherein generating the list of energy sources available to satisfy the energy request includes, by the server, limiting the list of energy sources to energy sources having more than the amount of energy requested included in the energy request.

10. The energy transfer method of claim 1 wherein generating the list of energy sources available to satisfy the energy request includes, by the server, limiting the list of energy sources to energy sources configured to transfer energy via one type of conduit.

11. The energy transfer method of claim 1 wherein generating the list of energy sources available to satisfy the energy request includes, by the server, limiting the list of energy sources to energy sources configured to transfer energy via one type of connector.

12. The energy transfer method of claim 1 wherein generating the list of energy sources available to satisfy the energy request includes, by the server, limiting the list of energy sources to energy sources with present locations that are within a predetermined distance of a present location of the energy receiver.

13. The energy transfer method of claim 1 wherein:
the energy request includes a maximum price for the amount of energy requested; and
generating the list of energy sources available to satisfy the energy request includes, by the server, limiting the list of energy sources to energy sources having associated energy selling prices that are less than the maximum price.

14. The energy transfer method of claim 1 wherein the energy receiver includes the first computing device.

15. The energy transfer method of claim 1 wherein the first computing device is not included in the energy receiver.

16. The energy transfer method of claim 1 wherein the energy receiver includes a vehicle.

17. The energy transfer method of claim 1 wherein the list of energy sources also include charging stations and utility connections of buildings.

18. An energy share system comprising:
a communication module configured to obtain, from a first computing device associated with an energy receiver, an energy request, wherein the energy request includes (i) a location of the energy receiver and (ii) an amount of energy requested;
a selection module configured to generate a list of energy sources available to satisfy the energy request,
wherein the list of energy sources includes vehicles,
wherein the communication module is further configured to:
transmit the list of energy sources to the first computing device for display on a display of the first computing device;
receive, from the first computing device, a selection of one energy source from the list of energy sources; and
transmit, to the first computing device and a second computing device associated with the selected one energy source, a location at which the energy request is to be fulfilled; and
an energy transfer module configured to selectively enable an electrical energy transfer from the selected one energy source to the energy receiver,
wherein the selected one energy source includes a vehicle, and
wherein the energy transfer module is configured to unlock a charge port of the vehicle, the charge port preventing access to an input/output conductor of the vehicle when locked and allowing access to the input/output conductor of the vehicle when unlocked.

19. The energy share system of claim 18 further comprising a payment module configured to:
charge an account associated with the energy receiver based on an amount of energy transferred from the selected one energy source to the energy receiver; and credit a second account associated with the selected one energy source based on the amount of energy transferred from the selected one energy source to the energy receiver.

20. The energy share system of claim 18 further comprising a key module configured to generate an energy access key for the electrical energy transfer from the selected one energy source to the energy receiver, wherein:
the communication module is further configured to:
transmit the energy access key to the first computing device; and
receive the energy access key from the first computing device;
the key module is further configured to authenticate the energy access key in response to receipt of the energy access key from the first computing device; and
the energy transfer module is further configured to enable the selected one energy source to transfer energy to the energy receiver in response to the authentication.

\* \* \* \* \*